United States Patent
Seto et al.

(10) Patent No.: US 8,310,917 B2
(45) Date of Patent: Nov. 13, 2012

(54) SWITCHING HUB AND RING NETWORK

(75) Inventors: Koichiro Seto, Amimachi (JP); Kenji Aoshima, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 219 days.

(21) Appl. No.: 12/801,564

(22) Filed: Jun. 15, 2010

(65) Prior Publication Data
US 2011/0051732 A1    Mar. 3, 2011

(30) Foreign Application Priority Data
Sep. 3, 2009 (JP) .................................. 2009-203762

(51) Int. Cl.
*H04L 12/42* (2006.01)
(52) U.S. Cl. ......... 370/222; 370/249; 370/403; 709/251
(58) Field of Classification Search .................... None
See application file for complete search history.

(56) References Cited

U.S. PATENT DOCUMENTS

| | | | |
|---|---|---|---|
| 2005/0243823 A1* | 11/2005 | Griswold et al. | 370/389 |
| 2008/0123562 A1* | 5/2008 | Florit et al. | 370/258 |
| 2008/0126536 A1 | 5/2008 | Sakurai | |
| 2009/0310481 A1* | 12/2009 | Deng et al. | 370/223 |
| 2010/0020809 A1* | 1/2010 | Jones et al. | 370/395.53 |
| 2010/0260196 A1* | 10/2010 | Holness et al. | 370/406 |

FOREIGN PATENT DOCUMENTS

| | | |
|---|---|---|
| JP | 2008-136013 | 6/2006 |
| JP | 2007-60232 | 3/2007 |

* cited by examiner

*Primary Examiner* — Hassan Phillips
*Assistant Examiner* — Duc Duong
(74) *Attorney, Agent, or Firm* — McGinn IP Law Group, PLLC

(57) ABSTRACT

A switching hub for processing a VLAN frame transmitted through a transmission line of a ring network includes two ring ports connected to the transmission line of the ring network, and a forwarding processing mechanism for, when one of the two ring ports receives the frame and when a VLAN in which the received frame belongs is a VLAN only through both the ring ports, forwarding the frame to the other ring port without performing FDB learning on the frame.

3 Claims, 4 Drawing Sheets

29 ADDRESS LEARNING UNIT
30 DESTINATION PORT DETERMINATION UNIT
31 FORWARDING UNIT
33 VLAN DETERMINATION UNIT

SWITCHING HUB AND RING NETWORK

The present application is based on Japanese patent application No. 2009-203762 filed on Sep. 3, 2009, the entire contents of which are incorporated herein by reference.

BACKGROUND OF THE INVENTION

1. Field of the Invention

The present invention relates to a switching hub connected in a ring shape to constitute a ring network, and a ring network.

2. Description of the Related Art

In conventional LAN (local area network) architecture, a technology is widely used that configures the network to physically include a loop, but to logically disconnect one portion of the loop, and thereby realize redundancy in case of network failure. As one example, a redundancy technology with a ring network 100 as shown in FIG. 6 has been proposed.

The ring network 100 is configured to connect first, second, third, and fourth switching hubs 101, 102, 103, and 104 (in the figure, also referred to as node 1, node 2, node 3, and node 4, respectively) in a ring shape. The first switching hub 101 has first, second, and third ports 101a, 101b, and 101c (in the figure, also referred to as port 1, port 2, and port 3, respectively). Likewise, the second switching hub 102 has first, second, and third ports 102a, 102b, and 102c, the third switching hub 103 has first, second, and third ports 103a, 103b, and 103c, and the fourth switching hub 104 has first, second, and third ports 104a, 104b, and 104c.

The respective first ports 101a to 104a and second ports 101b to 104b of the first to fourth switching hubs 101 to 104 are the ring ports to be connected to a transmission line 105 of the ring network 100.

The first port 104a of the fourth switching hub 104 is a blocking port in the ring, which logically disconnects one portion of its loop. The first port 104a of the fourth switching hub 104 is unblocked only when failure occurs in the network. This allows no frame transmitted through the transmission line 105 to be looped.

The third ports 101c to 104c of the first to fourth switching hubs 101 to 104 are the ports to be connected with terminals, respectively. The third port 104c of the fourth switching hub 104 is connected with the terminal 106, whose MAC (media access control) address is a. Likewise, the third port 103c of the third switching hub 103 is connected with the terminal 107, whose MAC address is b, the third port 102c of the second switching hub 102 is connected with the terminal 108, whose MAC address is c, and the third port 101c of the first switching hub 101 is connected with the terminal 109, whose MAC address is d.

With this ring network 100, a VLAN (virtual LAN) 1 is configured in a path from the terminal 106 to the terminal 108, while a VLAN 2 is configured in a path from the terminal 107 to the terminal 109.

First is described frame transmission from the terminal 106 to the terminal 108 in the VLAN 1.

Referring to FIG. 7, a frame 200 includes each field of a MAC-DA (destination address) 201 for storing a destination MAC address, a MAC-SA (source address) 202 for storing a source MAC address, a Tag 203 for storing a VLAN-ID, etc., an EtherType 204 for storing an Ether type, and a Data 205 for storing data.

The terminal 106 stores the MAC address c of the terminal 108 in the MAC-DA 201 of the frame 200, the MAC address a of the terminal 106 itself in the MAC-SA 202 of the frame 200, and a VLAN-ID of the VLAN 1 in the Tag 203 of the frame 200. Subsequently, the terminal 106 transmits the frame 200 to the third port 104c of the fourth switching hub 104.

The fourth switching hub 104 having received the frame 200 registers into an FDB (forwarding database) (herein referred to as FDB learning) a port having received the frame 200 (i.e. its receiving port), its source MAC address stored in the MAC-SA 202 of the frame 200, and its VLAN-ID stored in the Tag 203 of the frame 200. Subsequently, with the destination MAC address stored in the MAC-DA 201 of the frame 200, the fourth switching hub 104 retrieves its forwarding destination port from the FDB (destination retrieval), and transmits the frame 200 to the forwarding destination port. In FIG. 6, the fourth switching hub 104 transmits the frame 200 from its second port 104b to the third switching hub 103.

The third switching hub 103 receives the frame 200 in its first port 103a, and performs the FDB learning of the receiving port, the source MAC address, and the VLAN-ID. Subsequently, the third switching hub 103 performs its destination retrieval, and transmits the frame 200 from its second port 103b to the second switching hub 102.

The second switching hub 102 receives the frame 200 in its first port 102a, and performs the FDB learning of the receiving port, the source MAC address, and the VLAN-ID. Subsequently, the second switching hub 102 performs its destination retrieval, and transmits the frame 200 from its third port 102c to the terminal 108.

By the above operation, the frame 200 is transmitted from the terminal 106 to the terminal 108.

Next is described frame transmission from the terminal 107 to the terminal 109 in the VLAN 2.

The terminal 107 stores the MAC address d of the terminal 109 in the MAC-DA 201 of the frame 200, the MAC address b of the terminal 107 itself in the MAC-SA 202 of the frame 200, and a VLAN-ID of the VLAN 2 in the Tag 203 of the frame 200. Subsequently, the terminal 107 transmits the frame 200 to the third port 103c of the third switching hub 103.

The third switching hub 103 having received the frame 200 performs the FDB learning of a port having received the frame 200 (i.e. its receiving port), its source MAC address, and its VLAN-ID. Subsequently, the third switching hub 103 performs its destination retrieval, and transmits the frame 200 from its second port 103b to the second switching hub 102.

The second switching hub 102 receives the frame 200 in its first port 102a, and performs the FDB learning of the receiving port, the source MAC address, and the VLAN-ID. Subsequently, the second switching hub 102 performs its destination retrieval, and transmits the frame 200 from its second port 102b to the first switching hub 101.

The first switching hub 101 receives the frame 200 in its first port 101a, and performs the FDB learning of the receiving port, the source MAC address, and the VLAN-ID. Subsequently, the first switching hub 101 performs its destination retrieval, and transmits the frame 200 from its third port 101c to the terminal 109.

By the above operation, the frame 200 is transmitted from the terminal 107 to the terminal 109.

In this manner, the conventional switching hub performs the FDB learning of receiving ports, source MAC addresses, and VLAN-IDs, for all of received frames.

Refer to JP-A-2008-136013 and JP-A-2007-60232, for example.

Because the conventional switching hub performs the FDB learning of receiving ports, source MAC addresses, and VLAN-IDs for all of received frames, the conventional switching hub is, however, likely to cause the overflow of entries in the FDB with increasing number of terminals to connect. In the event of the overflow of entries in the FDB, the FDB learning cannot be performed any longer. There therefore arises the problem that unnecessary flood relays are performed, to waste transmission line bands. There also arises the problem that, with further increasing number of entries in the FDB, the CPU load to manage them is increased.

Also, the FDB is erased in case of failure. In this case, there is also the problem that the erasure of the FDB is time consuming when the FDB contains large numbers of entries.

SUMMARY OF THE INVENTION

Accordingly, it is an object of the present invention to provide a switching hub and a ring network, capable of reducing amounts to be learned by an FDB of the switching hub.

(1) According to one embodiment of the invention, a switching hub for processing a VLAN frame transmitted through a transmission line of a ring network comprises:

two ring ports connected to the transmission line of the ring network; and a forwarding processing mechanism for, when one of the two ring ports receives the frame and when a VLAN in which the received frame belongs is a VLAN only through both the ring ports, forwarding the frame to the other ring port without performing FDB learning on the frame.

In the above embodiment (1), the following modifications and changes can be made.

(i) The forwarding processing mechanism includes a VLAN determination unit for determining whether or not the VLAN in which the frame belongs is a VLAN only through both the ring ports, and a transmit processing unit for, when the VLAN in which the frame belongs is a VLAN only through both the ring ports, forwarding the frame to the other ring port.

(ii) The forwarding processing mechanism includes an address learning unit for, when the VLAN in which the frame belongs is not a VLAN only through both the ring ports, performing FDB learning on the frame; a destination port determination unit for, when the VLAN in which the frame belongs is not a VLAN only through both the ring ports, retrieving from an FDB and determining a destination port of the frame; and a transmit processing unit for forwarding the frame to the destination port determined by the destination port determination unit.

(iii) The switching hub further comprises a VLAN setting table for presetting the acceptance/rejection of access to an FDB for each VLAN, the VLAN determination unit referencing the VLAN setting table to determine whether or not the VLAN in which the frame belongs is a VLAN only through both the ring ports.

(iv) The VLAN setting table also serves as a VLAN filtering table to preset a port, which is accepting forwarding, for each VLAN (2) According to another embodiment of the invention, a ring network comprises:

a plurality of switching hubs connected in a ring shape to constitute the ring network, the switching hubs each comprising two ring ports connected to a transmission line of the ring network, and when one of the two ring ports receives a VLAN frame and when a VLAN in which the received frame belongs is a VLAN only through both the ring ports, forwarding the frame to the other ring port without performing FDB learning on the frame.

Points of the Invention

According to the embodiments of the invention, when one of the two ring ports receives the frame and when a VLAN in which the received frame belongs is a VLAN only through both the ring ports, the forwarding processing mechanism forwards the frame to the other ring port without performing FDB learning on the frame. The switching hub can therefore reduce amounts to be learned by its FDB. This can reduce the size of the table of the FDB, and therefore contribute to cost reduction, while making it possible to inhibit the overflow of entries in the FDB, and therefore reduce unnecessary flood relays. Also, it is possible to reduce CPU load for the administration of the FDB, such as PDB erase for switching in case of failure.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Below is described a preferred embodiment according to the invention, referring to FIGS. 1, 2, and 3.

Ring Network 10 Configuration

Figure 1:
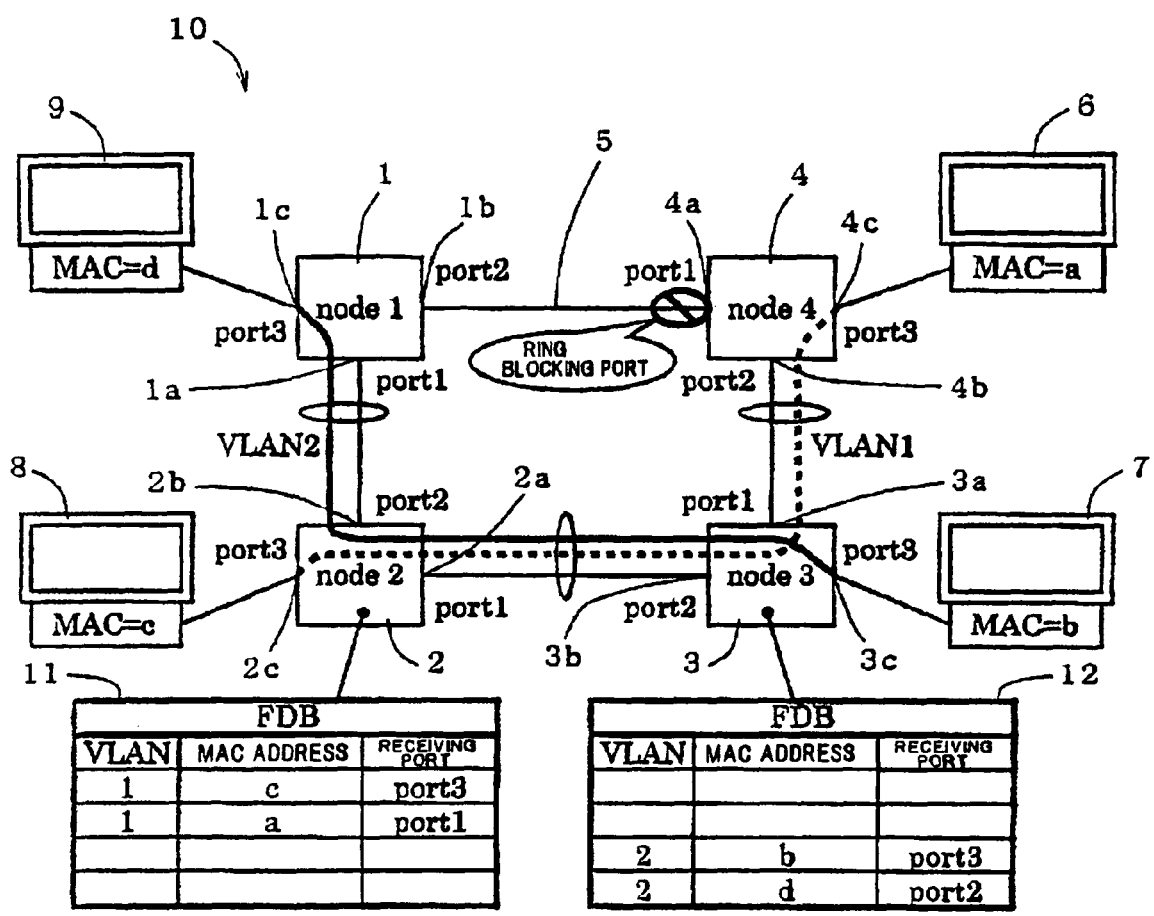
FIG. 1 is a diagram showing a ring network in one embodiment according to the invention.

FIG. 1 is a diagram showing a ring network in this embodiment.

As shown in FIG. 1, a ring network 10 is configured to connect first, second, third, and fourth switching hubs 1, 2, 3, and 4 (in the figure, also referred to as node 1, node 2, node 3, and node 4, respectively) in a ring shape.

The first switching hub 1 has first, second, and third ports 1a, 1b, and 1c (in the figure, also referred to as port 1, port 2, and port 3, respectively). Likewise, the second switching hub 2 has first, second, and third ports 2a, 2b, and 2c, the third switching hub 3 has first, second, and third ports 3a, 3b, and 3c, and the fourth switching hub 4 has first, second, and third ports 4a, 4b, and 4c.

The respective first ports 1a to 4a and second ports 1b to 4b of the first to fourth switching hubs 1 to 4 are the ring ports to be connected to a transmission line 5 of the ring network 10.

The first port 4a of the fourth switching hub 4 is a blocking port in the ring, which logically disconnects a portion of its loop. The first port 4a of the fourth switching hub 4 is unblocked only when failure occurs in the network. This allows no frame transmitted through the transmission line 5 to be looped.

The third ports 1c to 4c of the first to fourth switching hubs 1 to 4 are the ports to be connected with terminals, respectively. The third port 4c of the fourth switching hub 4 is connected with the terminal 6, whose MAC address is a.

Likewise, the third port 3c of the third switching hub 3 is connected with the terminal 7, whose MAC address is b, the third port 2c of the second switching hub 2 is connected with the terminal 8, whose MAC address is c, and the third port 1c of the first switching hub 1 is connected with the terminal 9, whose MAC address is d.

With this ring network 10, a VLAN 1 is configured between the terminals 6 to 8, while a VLAN 2 is configured between the terminals 7 to 9. That is, the VLAN 1 is set in a path connected from the terminal 6 to the terminal 8 through the fourth, third, and second switching hubs 4, 3, and 2, while the VLAN 2 is set in a path connected from the terminal 7 to the terminal 9 through the third, second, and first switching hubs 3, 2, and 1.

Here is described a switching hub in this embodiment, which constitutes the first, second, third, and fourth switching hubs 1, 2, 3, and 4.

Figure 2:
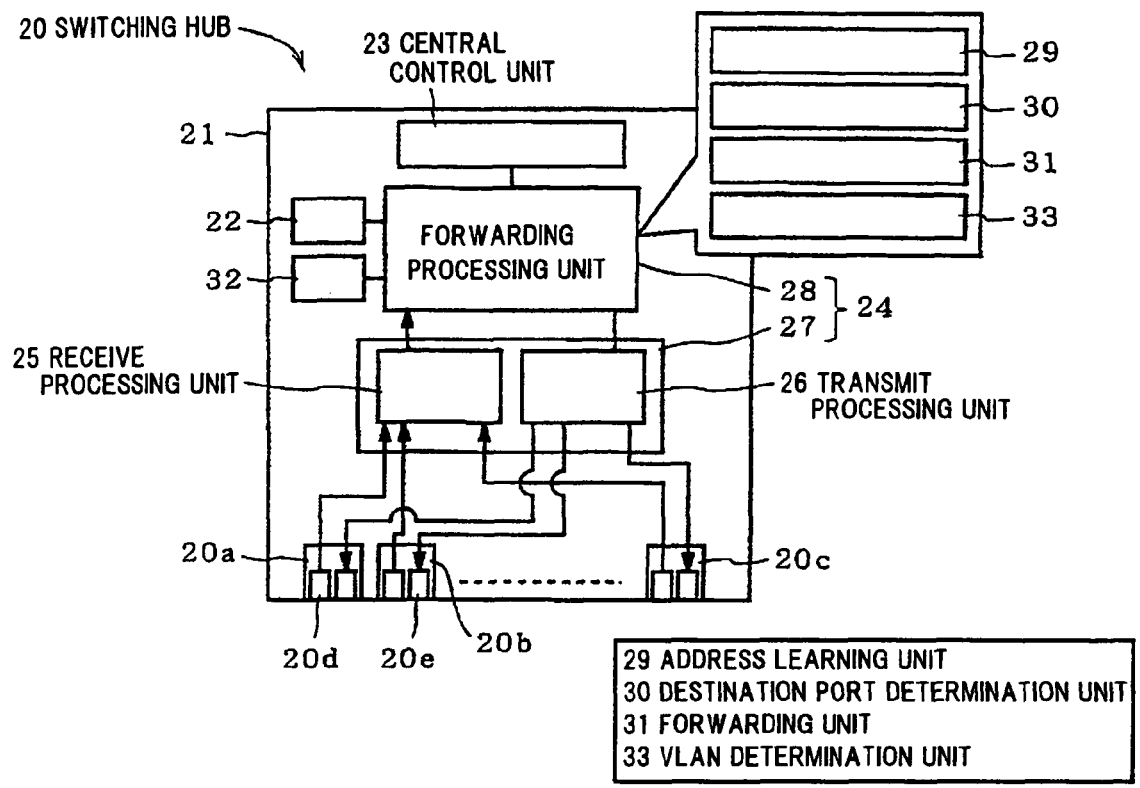
FIG. 2 is a structural diagram showing a switching hub in the embodiment according to the invention.
Figure 7:
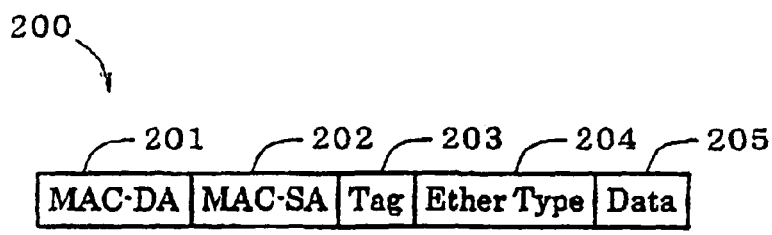
FIG. 7 is a configuration diagram showing a frame to be transmitted in the ring network.

Referring to FIG. 2, a switching hub 20 in this embodiment is a box switching hub with a chassis 21, which includes, in the chassis 21, first and second ports 20a and 20b, which serve as ring ports, and one or plural third ports 20c, which serve as non-ring ports. The ports 20a to 20c each have a receiving port 20d for receiving a frame 200 (see FIG. 7), and a transmitting port 20e for transmitting a frame 200.

The switching hub 20 further includes an FDB 22, a central control unit 23 for performing settings of each unit, and a forwarding processing mechanism 24.

The forwarding processing mechanism 24 comprises a transmit/receive processing unit 27 comprising a receive processing unit 25 and a transmit processing unit 26, and a forwarding processing unit 28 for performing a variety of processing on a frame 200.

The receive processing unit 25 is for inserting an identifier indicative of each receiving port having received a frame 200, into the beginning of that frame 200 (see FIG. 7) received in each port, as an internal header, and subsequently sending that frame 200 to the forwarding processing unit 28.

The forwarding processing unit 28 includes an address learning unit 29 for referencing the internal header of the frame 200 sent from the receive processing unit 25, to acquire the receiving port, while referencing a MAC-SA 202 field of that frame 200 to acquire a source MAC address, and register the acquired receiving port and the source MAC address into the FDB 22 (i.e. perform FDB learning). Also, the forwarding processing unit 28 includes a destination port determination unit 30 for referencing a MAC-DA 201 field of the frame 200 to acquire a destination MAC address, to thereby retrieve from the FDB 22 and determine a destination port, and a forwarding unit 31 for inserting an identifier indicative of the destination port into the frame 200 as an internal header, and forwarding that frame 200 to the transmit processing unit 26.

The transmit processing unit 26 is for referencing the internal header of the frame 200 from the forwarding processing unit 28, to acquire the destination port, and forward the frame 200 to that acquired destination port. The internal header is deleted at the transmit processing unit 26.

In this manner, when receiving the frame 200, the switching hub 20 performs the FDB learning of its receiving port and source MAC address, and relays the frame 200.

Here is examined the operation of the third switching hub 3 when receiving a VLAN 1 frame.

When receiving the VLAN 1 frame 200 at the first port 3a, the third switching hub 3 always transmits it from the second port 3b to the second switching hub 2. When receiving the VLAN 1 frame 200 at the second port 3b, the third switching hub 3 always transmits it from the first port 3a to the fourth switching hub 4.

From this point of view, the inventors have found out that, when one ring port (the first port 3a or the second port 3b) receives the VLAN 1 frame 200, the same operation can be done by outputting it to the other ring port without referencing the FDB 22. This operation allows the elimination of the need to perform the FDB learning on the VLAN 1 frame at the third switching hub 3. Also, the same may apply to the second switching hub 2 when it receives a VLAN 2 frame.

Figure 6:
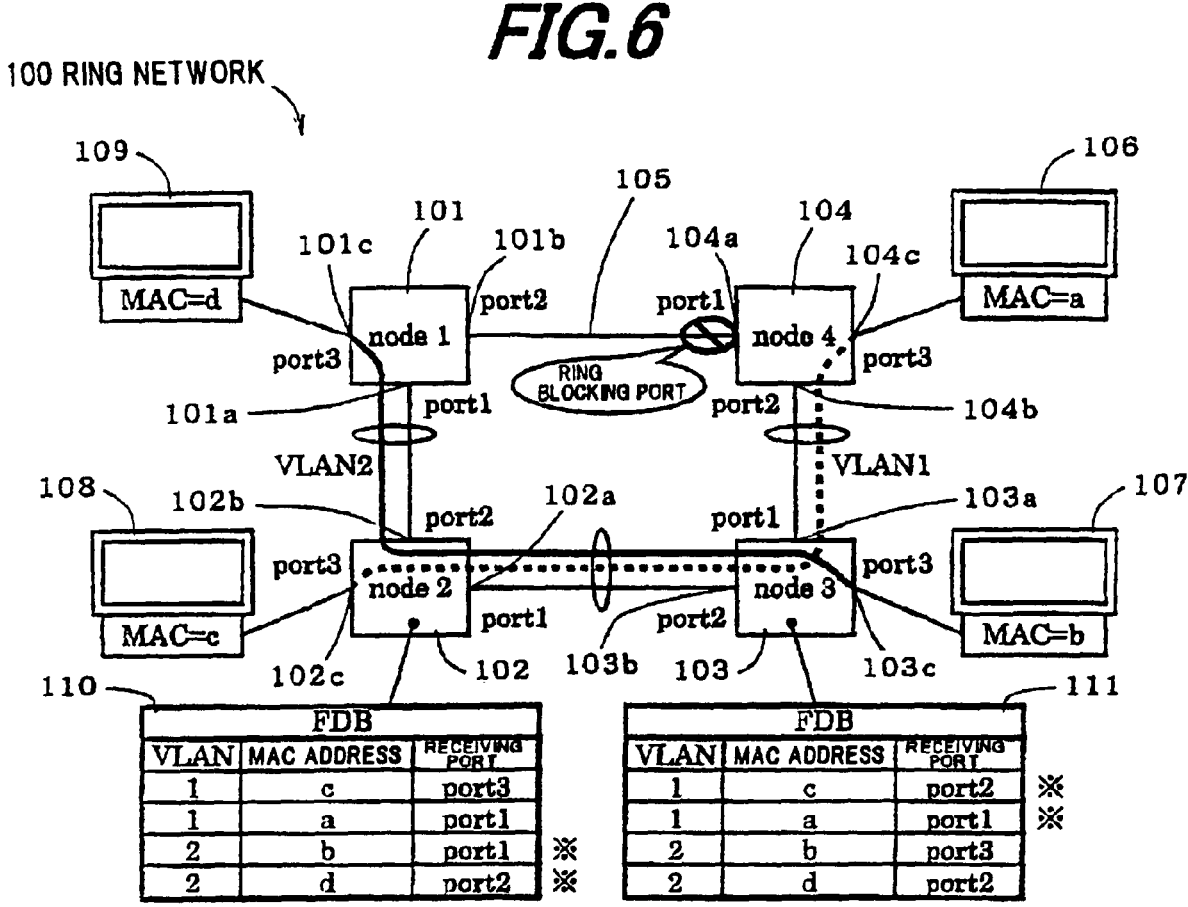
FIG. 6 is a diagram explaining operation of a conventional switching hub in the ring network.

Thus, this operation can reduce amounts to be learned by the respective FDBs of the second and third switching hubs 2 and 3 (i.e. can reduce entries in rows indicated with an asterisk in FDBs 110 and 111 in FIG. 6).

Accordingly, when the switching hub 20 in this embodiment receives the frame 200 in one of both its ring ports (its first and second ports 20a and 20b), and when a VLAN in which the received frame 200 belongs is a VLAN only through both the ring ports (which herein is referred to as the ring VLAN), the switching hub 20 in this embodiment forwards the frame 200 to the other ring port without performing the FDB learning on the frame 200.

To ensure this operation, the switching hub 20 includes a VLAN setting table 32 for presetting the acceptance/rejection of access to the FDB 22 for each VLAN. Also, the forwarding processing unit 28 of the switching hub 20 includes a VLAN determination unit 33 for determining whether or not the VLAN in which the frame 200 belongs is the ring VLAN.

In the VLAN setting table 32 are set the acceptance/rejection of access to the FDB 22 for each VLAN, and the acceptance/rejection of forwarding to each port for each VLAN.

Table 1 shows a VLAN setting table of the switching hub 20 for use as the second switching hub 2. In the second switching hub 2, for the VLAN 1, the access to the FDB 22 is being accepted, and the forwarding to the first and third ports 20a (port 1) and 20c (port 3) is being accepted.

TABLE 1

VLAN setting table

| VLAN | Access to FDB | port 1 | port 2 | port 3 |
| --- | --- | --- | --- | --- |
| 1 | Accepted | Accepted | Rejected | Accepted |
| 2 | Rejected | Accepted | Accepted | Rejected |

The reason for the forwarding to the second port 20b (port 2) being rejected is because no VLAN 1 frame 200 can be transmitted from the second port 20b. It is because, as shown in FIG. 1, in the VLAN 1, the second switching hub 2 is the terminating switching hub, and is therefore not necessary to forward the frame 200 clockwise, as illustrated. Also, for the VLAN 2, the access to the FDB 22 is being rejected. The rejecting of access to the FDB 22 refers to disabling the FDB learning, or disabling the referencing of the FDB 22 and the destination port retrieval.

Also, Table 2 shows a VLAN setting table of the switching hub 20 for use as the third switching hub 3. In the third switching hub 3, for the VLAN 2, the access to the FDB 22 is being accepted, and the forwarding to the second and third ports 20b (port 2) and 20c (port 3) is being accepted. Also, for the VLAN 1, the access to the FDB 22 is being rejected.

TABLE 2

VLAN setting table

| VLAN | Access to FDB | port 1 | port 2 | port 3 |
|------|---------------|----------|----------|----------|
| 1 | Rejected | Accepted | Accepted | Rejected |
| 2 | Accepted | Rejected | Accepted | Accepted |

In this manner, the VLAN setting table 32 is preset to reject the access to the FDB 22 for the ring VLAN only through both the ring ports (the first and second ports 20a and 20b), while accepting the access to the FDB 22 for the non-ring VLAN through the non-ring port, i.e. the third port 20c.

The VLAN determination unit 33 is for referencing the VLAN setting table 32 to determine whether or not the VLAN in which the frame 200 belongs is the ring VLAN. That is, the VLAN determination unit 33 references the acceptance/rejection of access to the FDB 22 for the VLAN in which the frame 200 belongs, to determine that that VLAN is the ring VLAN when the access to the FDB 22 is being rejected, or the non-ring VLAN when the access to the FDB 22 is being accepted.

Figure 3:
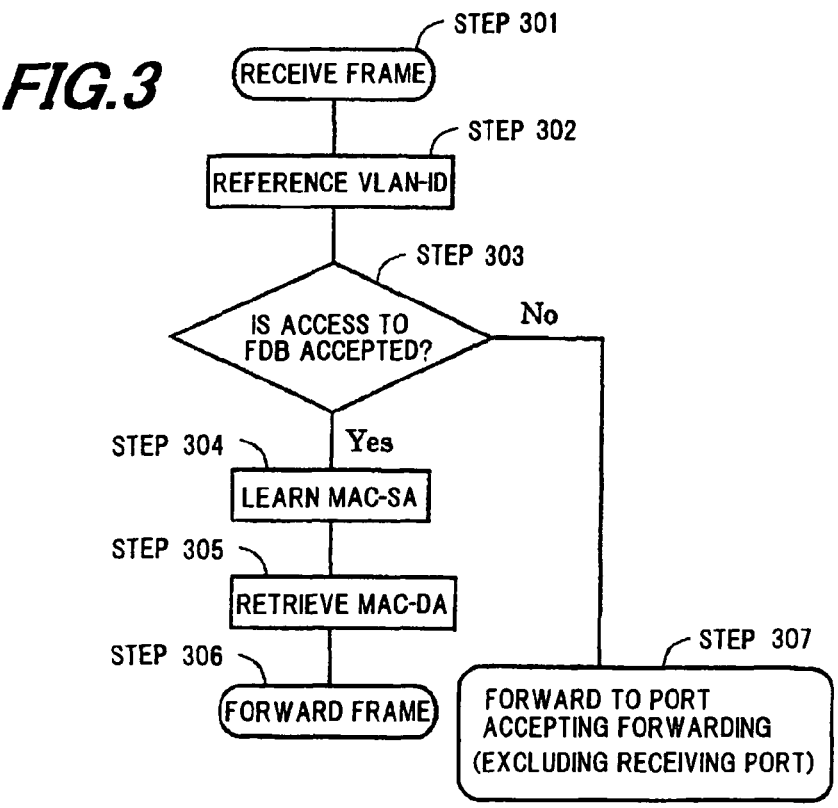
FIG. 3 is a diagram explaining operation of the switching hub in the embodiment according to the invention.

FIG. 3 is a diagram explaining operation of this switching hub 20.

As shown in FIG. 3, the switching hub 20 receives a frame 200 in any one of the ports 20a to 20c (STEP 301). The frame 200 is sent to the forwarding processing unit 28, and the VLAN determination unit 33 of the forwarding processing unit 28 references a VLAN-ID of the frame 200 to specify a VLAN in which the frame 200 belongs (STEP 302). The VLAN determination unit 33 references the VLAN setting table 32, i.e. the acceptance/rejection of access to the FDB 22 for that specified VLAN, to determine that that VLAN is the ring VLAN when the access to the FDB 22 is being rejected, or the non-ring VLAN when the access to the FDB 22 is being accepted (STEP 303).

When it is determined that the VLAN in which the frame 200 belongs is not the ring VLAN, the address learning unit 29 of the forwarding processing unit 28 acquires the receiving port and a source MAC address (MAC-SA) of the frame 200, and registers the acquired receiving port and the source MAC address into the FDB 22 (STEP 304). Subsequently, the destination port determination unit 30 of the forwarding processing unit 28 acquires a destination MAC address (MAC-DA) of the frame 200, to thereby retrieve from the FDB 22 and determine a destination port (STEP 305). After the destination port determination, the forwarding unit 31 of the forwarding processing unit 28 inserts an identifier indicative of the destination port into the frame 200 as an internal header, and forwards that frame 200 to the transmit processing unit 26 (STEP 306). In the steps 305 and 306, when the destination MAC address is a broadcast address, or when the destination MAC address is not being registered in the FDB 22, the forwarding unit 31 references the VLAN setting table 32, inserts an identifier indicative of a port which is accepting forwarding (excluding the receiving port) into the frame 200 as an internal header, and forwards that frame 200 to the transmit processing unit 26.

On the other hand, when in the step 303 it is determined that the VLAN in which the frame 200 belongs is the ring VLAN, the FDB 22 is not accessed, and the forwarding unit 31 of the forwarding processing unit 28 references the VLAN setting table 32, inserts an identifier indicative of a port which is accepting forwarding (excluding the receiving port) into the frame 200 as an internal header, and forwards that frame 200 to the transmit processing unit 26 (STEP 307).

The transmit processing unit 26 references the internal header of the frame 200 from the forwarding unit 31, to acquire the destination port, and forward the frame 200 to that acquired destination port. The internal header is deleted at the transmit processing unit 26.

By the above operation, when the switching hub 20 receives the frame 200 in either of both the ring ports (the first and second ports 20a and 20b), and when a VLAN in which the received frame 200 belongs is the ring VLAN only through both the ring ports, the switching hub 20 forwards the frame 200 to the other ring port without performing the FDB learning on the frame 200.

That is, as shown in FIG. 1, the second switching hub 2 registers into its FDB 11 only the terminals associated with the VLAN 1, while the third switching hub 3 registers into its FDB 12 only the terminals associated with the VLAN 2.

Assume, for example, that in the ring network 10 with the VLANs 1 and 2 configured as in FIG. 1, each of the first, second, third, and fourth switching hubs 1, 2, 3, and 4 constituted by the switching hub 20 in this embodiment is connected with 25 terminals. In the prior art, the second and third switching hubs 2 and 3 each perform the FDB learning for all of the 100 terminals. In contrast, in the present invention, the second and third switching hubs 2 and 3 each may perform the FDB learning for 50 terminals of the 100 terminals, because of no need to perform the FDB learning for terminals connected to the ring VLAN.

Advantages of the First Embodiment

The switching hub 20 in this embodiment can reduce amounts to be learned by its FDB. This can reduce the size of the table of the FDB 22, and therefore contribute to cost reduction, while making it possible to inhibit the overflow of entries in the FDB 22, and therefore reduce unnecessary flood relays.

Also, it is possible to reduce CPU load for the administration of the FDB 22, such as FDB erase for switching in case of failure.

Second Embodiment

Figure 4:
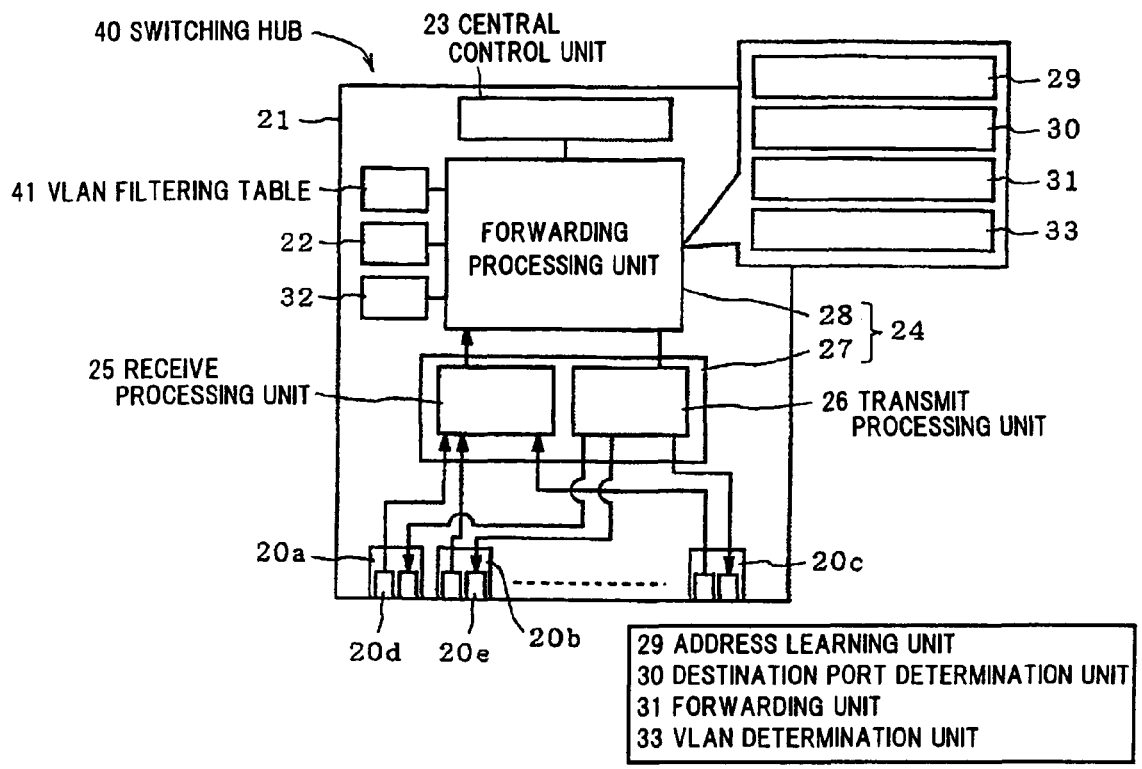
FIG. 4 is a configuration diagram showing a switching hub in another embodiment according to the invention.

FIG. 4 shows a switching hub 40 in another embodiment according to the invention.

Although in the embodiment of FIG. 2, the acceptance/rejection of access to the FDB 22 for each VLAN, and the acceptance/rejection of forwarding to each port for each VLAN have been set in the VLAN setting table 32, only the acceptance/rejection of access to the FDB 22 for each VLAN may be set in the VLAN setting table 32, and a separate VLAN filtering table 41 may, as shown in FIG. 4, be provided to set the acceptance/rejection of forwarding to each port for each VLAN in the VLAN filtering table 41. In this case, a setting example of the VLAN setting table 32 and the VLAN filtering table 41 of the second switching hub 2 is shown in Table 3, and a setting example of the VLAN setting table 32 and the VLAN filtering table 41 of the third switching hub 3 is shown in Table 4.

TABLE 3

| VLAN setting table | | VLAN filtering table | | | |
|------|----------|------|----------|----------|----------|
| VLAN | Access to FDB | VLAN | port 1 | port 2 | port 3 |
| 1 | Accepted | 1 | Accepted | Rejected | Accepted |
| 2 | Rejected | 2 | Accepted | Accepted | Rejected |

TABLE 4

| VLAN setting table | | VLAN filtering table | | | |
|---|---|---|---|---|---|
| VLAN | Access to FDB | VLAN | port 1 | port 2 | port 3 |
| 1 | Rejected | 1 | Accepted | Accepted | Rejected |
| 2 | Accepted | 2 | Rejected | Accepted | Accepted |

Figure 5:
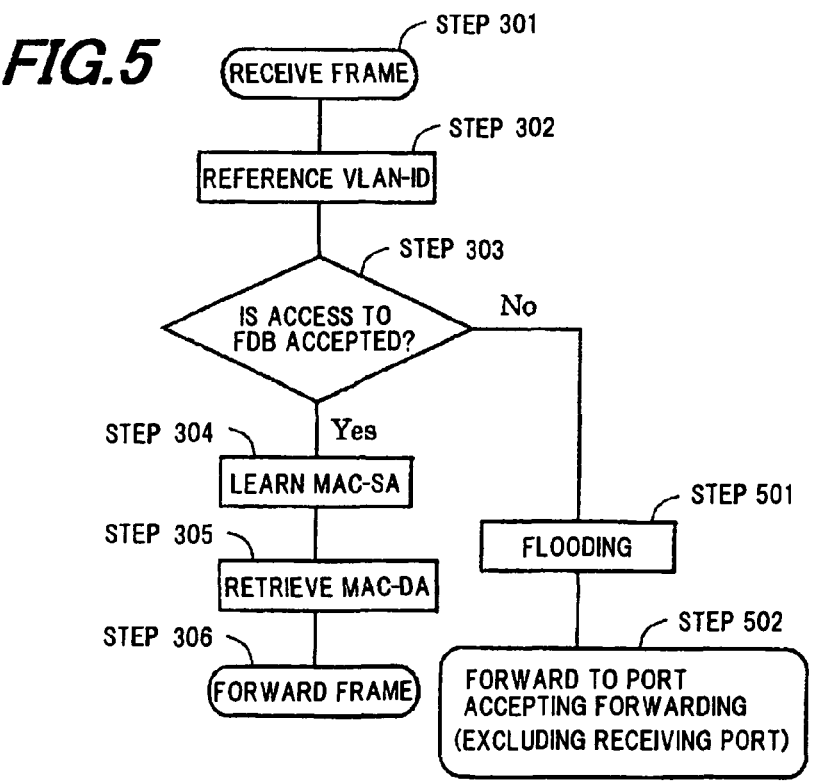
FIG. 5 is a diagram explaining operation of the switching hub in the another embodiment according to the invention.

In this manner, in the switching hub 40 further provided with the VLAN filtering table 41, the steps 301 to 306, as shown in FIG. 5, are the same as those of the above-described switching hub 20, but the operation of the switching hub 40 is different when it is determined that a VLAN in which the received frame 200 belongs is the ring VLAN.

Namely, in the switching hub 40, when it is determined in the step 303 that a VLAN in which the frame 200 belongs is the ring VLAN, the forwarding unit 31 of the forwarding processing unit 28 floods the frame 200 as its destination address unknown (STEP 501), and references the VLAN filtering table 41, inserts an identifier indicative of a port which is accepting forwarding (excluding the receiving port) into the frame 200 as an internal header, and forwards that frame 200 to the transmit processing unit 26 (STEP 502). The transmit processing unit 26 references the internal header of the frame 200 from the forwarding unit 31, to acquire the destination port, and forward the frame 200 to that acquired destination port.

Thus, even this switching hub 40 can also reduce amounts to be learned by its FDB.

Also, although in this embodiment has been described the box switching hub, it may be applied to chassis switching hubs.

Also, although in this embodiment the frame 200 is of an Ethernet (registered trademark) frame format, it is not limited thereto, but may be applied to IEEE 802.1ah or other format frames.

Although in this embodiment the ring network 10 has been configured by use of only the switching hub 20, another switching hub, such as a conventional switching hub, may be mixed in the ring network 10.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A switching hub for processing a VLAN frame transmitted through a transmission line of a ring network, comprising:
   two ring ports connected to the transmission line of the ring network;
   a forwarding processing mechanism for, when one of the two ring ports receives the frame and when a VLAN in which the received frame belongs is a VLAN only through both the ring ports, forwarding the frame to the other ring port without performing FDB learning on the frame,
   wherein the forwarding processing mechanism includes a VLAN determination unit for determining whether or not the VLAN in which the frame belongs is a VLAN only through both the ring ports, and a transmit processing unit for, when the VLAN in which the frame belongs is a VLAN only through both the ring ports, forwarding the frame to the other ring port,
   wherein the forwarding processing mechanism includes an address learning unit for, when the VLAN in which the frame belongs is not a VLAN only through both the ring ports, performing FDB learning on the frame; a destination port determination unit for, when the VLAN in which the frame belongs is not a VLAN only through both the ring ports, retrieving from an FDB and determining a destination port of the frame; and a transmit processing unit for forwarding the frame to the destination port determined by the destination port determination unit.

2. A switching hub for processing a VLAN frame transmitted through a transmission line of a ring network, comprising:
   two ring ports connected to the transmission line of the ring network; and
   a forwarding processing mechanism for, when one of the two ring ports receives the frame and when a VLAN in which the received frame belongs is a VLAN only through both the ring ports, forwarding the frame to the other ring port without performing FDB learning on the frame,
   wherein the forwarding processing mechanism includes a VLAN determination unit for determining whether or not the VLAN in which the frame belongs is a VLAN only through both the ring ports, and a transmit processing unit for, when the VLAN in which the frame belongs is a VLAN only through both the ring ports, forwarding the frame to the other ring port; and
   a VLAN setting table for presetting the acceptance/rejection of access to an FDB for each VLAN, the VLAN determination unit referencing the VLAN setting table to determine whether or not the VLAN in which the frame belongs is a VLAN only through both the ring ports.

3. The switching hub according to claim 2, wherein the VLAN setting table also serves as a VLAN filtering table to preset a port, which is accepting forwarding, for each VLAN.

* * * * *